United States Patent [19]

Nakamura et al.

[11] Patent Number: 4,797,084

[45] Date of Patent: Jan. 10, 1989

[54] MOLD DEVICE FOR MOLDING A PREFORM

[75] Inventors: Yoshinori Nakamura; Kouhei Koga; Satoru Kosuge; Yoshihiro Fukunishi, all of Hanishina, Japan

[73] Assignee: Nissei ASB Machine Co., Ltd., Japan

[21] Appl. No.: 934,196

[22] Filed: Nov. 24, 1986

[30] Foreign Application Priority Data

Nov. 29, 1985 [JP] Japan .............................. 60-270029
Oct. 31, 1986 [JP] Japan .............................. 61-260373

[51] Int. Cl.$^4$ .................. B29C 45/06; B29C 49/36
[52] U.S. Cl. ................................. 425/533; 425/534; 425/540; 425/576
[58] Field of Search ............... 425/577, 436 R, 412, 425/450.1, 450.9, 444, 441, 443, 438, 116, 117, 126 R, 129 R, 533, 534, 540, 542, 577, 576

[56] References Cited

U.S. PATENT DOCUMENTS

| | | | |
|---|---|---|---|
| 3,224,040 | 12/1965 | Bridges et al. | 425/436 |
| 3,632,274 | 1/1972 | Gillespie | 425/436 |
| 3,820,930 | 6/1974 | Hehl | 425/533 |
| 3,905,740 | 9/1975 | Lovejoy | 425/577 |
| 4,422,843 | 12/1983 | Aoki | 425/533 |
| 4,473,515 | 9/1984 | Ryder | 425/533 |
| 4,529,372 | 7/1985 | Saumsiegle | 425/533 |
| 4,648,824 | 3/1987 | Aoki | 425/540 |

FOREIGN PATENT DOCUMENTS

| | | | |
|---|---|---|---|
| 1149869 | 1/1958 | France | 425/444 |
| 4637093 | 11/1971 | Japan | 425/533 |

Primary Examiner—Willard E. Hoag
Attorney, Agent, or Firm—Ostrolenk, Faber, Gerb & Soffen

[57] ABSTRACT

A mold device for molding a preform in which a lip mold is provided on the lower surface of a transfer plate rotatably mounted above a machine bed, and the lip mold is moved up and down together with a core mold to carry out opening and closing a mold without vertically moving the cavity mold with respect to the lip mold or without vertically moving the transfer mold together with the lip mold with respect to the fixed cavity mold.

14 Claims, 9 Drawing Sheets

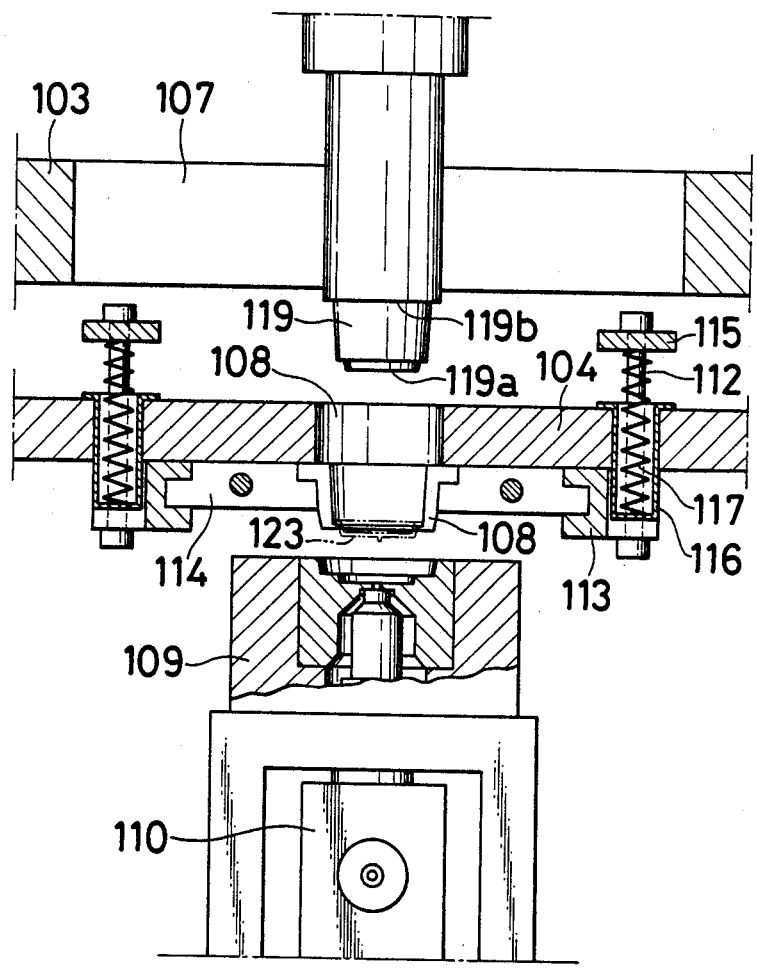

MOLD DEVICE FOR MOLDING A PREFORM

BACKGROUND OF THE INVENTION

1. Field of the Invention

This invention relates to a mold device for molding a preform incorporated into a rotary type injection blow molding machine.

2. Description of the Prior Art

A molding machine for continuously carrying out a series of operation from injection molding of a preform to blow molding of a container such as a bottle is known from Japanese Patent Publication No. 53-22096.

In a mold device for molding a preform disposed in this known molding machine, a cavity mold is moved up and down with respect to a neck mold on the underside of an upper base plate above a machine bed to open and close a mold. Therefore, when the mold is opened, a nozzle of an injection apparatus has to be released, which entails a longer injection molding cycle. In addition, the nozzle brings forth stringiness, leakage or the like depending on the kind of resin used.

In view of the foregoing, it was attempted to secure the cavity mold on a machine bed and to move a neck mold up and down. In this case, the neck mold has to be moved up and down together with a transfer plate. This poses other problems. For example, the apparatus becomes complicated in terms of other operating portions and it takes time to rotate the transfer plate immediately after opening of the mold to transfer a preform together with the neck mold to a next operating portion.

OBJECTS AND SUMMARY OF THE INVENTION

This invention aims to solve the above-described prior art problems. It is an object of the present invention to provide a mold device for molding a preform in which a cavity mold and a transfer plate are not moved up and down but a lip mold serving as a molding mold and a retaining mold in the outer periphery of an opening of a preform is moved up and down to open and close a mold.

It is a further object of this invention to provide a new mold device for a rotary molding machine in which both a cavity mold and a blow mold for molding a preform may be disposed on a machine bed despite the fact that a lip mold is mounted movably up and down on the lower surface of a transfer plate.

For achieving the above-described objects, the present invention provides an arrangement wherein a cavity mold is secured onto a machine bed, a lip mold serving as a retaining mold for molding an outer peripheral portion of an opening of a preform at an upper part of the cavity mold together with a mold place plate is disposed on the lower surface of a transfer plate under of an upper base plate, and a core mold extending through holes formed in the upper base plate and transfer plate to be fitted into the retaining mold is arranged upwardly of the upper base plate. The lip mold is resiliently mounted on the transfer plate by means of a vertical shaft and a spring member so that the lip mold may be moved up and down with respect to the cavity mold by the core mold.

The present invention provides a further arrangement wherein said mold place plate is connected to lower ends of a plurality of vertically movable vertical shafts extending through the transfer plate, and a spring member for constantly urging the mold place plate together with the lip mold against the lower surface of the transfer plate through the vertical shafts is provided between a connecting plate provided over the upper ends of the vertical shafts and said transfer plate.

In this way, when the lip mold at the under surface of the transfer plate, together with the core mold inserted while extending through the holes from above of the upper base plate, is urged against the transfer plate by the vertical shafts and the spring member so that the former may be moved to be opened and closed with respect to the cavity mold, the opening and closing of the mold can be carried out merely by upward and downward movement of the lip mold, the cavity mold remaining fixed in place. Therefore, since the injection device remains in nozzle-touching state the molding cycle is shortened. In addition, no stringiness or leakage of resin occurs. Since a clamping device may be provided on the core mold side alone, the structure of the injection molding operating portion is simplified.

In the case where the lip mold at the under surface of the transfer plate, together with the core mold inserted while extending through the holes from above of the upper base plte, is urged against the lower surface of the transfer plate by the vertical shafts extending through the transfer plate and the spring member for always upwardly biasing the vertical shaft so that the former may be moved to be opened and closed with respect to the cavity mold, not only the cavity mold but the blow mold are not moved up and down but may be installed on the lower base plate since the vertical shafts do not disturb the transfer plate in rotation in connection with the blow mold.

BRIEF DESCRIPTION OF THE DRAWINGS

FIG. 9 is a longitudinal sectional side view in the state where a mold is opened.

DESCRIPTION OF THE PREFERRED EMBODIMENTS

Figure 1:
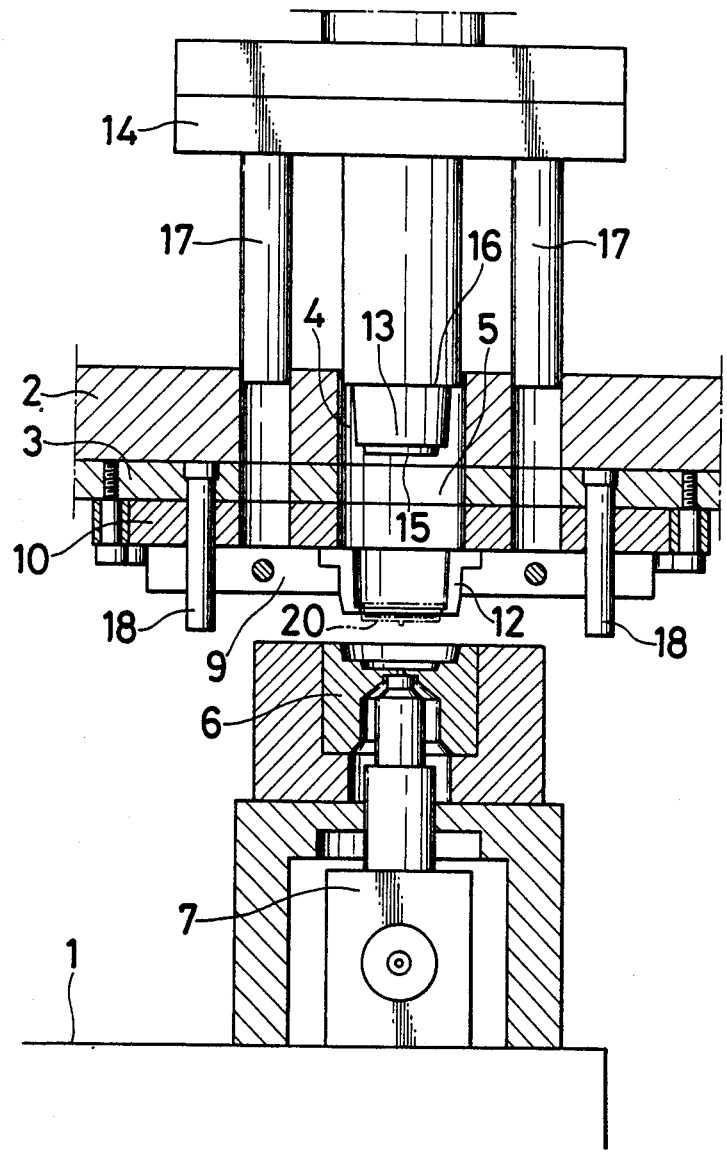
FIG. 1 is a longitudinal sectional front view of a mold device for molding a preform according to the present invention.
Figure 2:
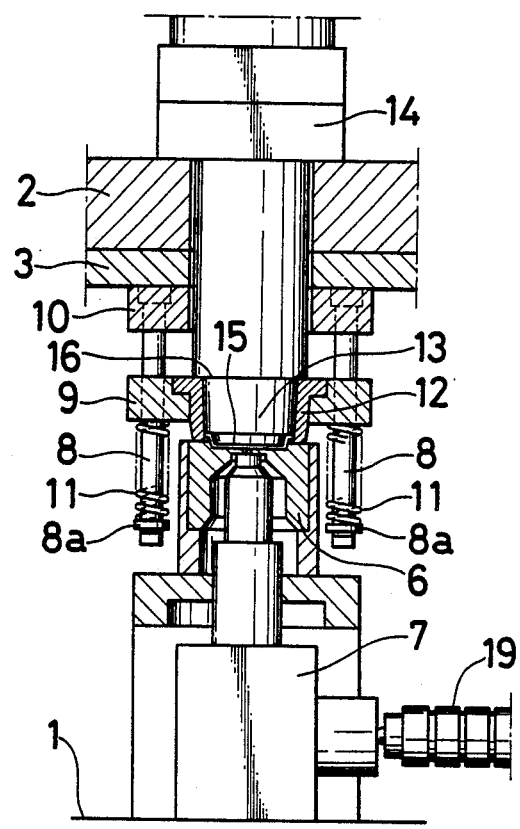
FIG. 2 is a longitudinal sectional side view.
Figure 3:
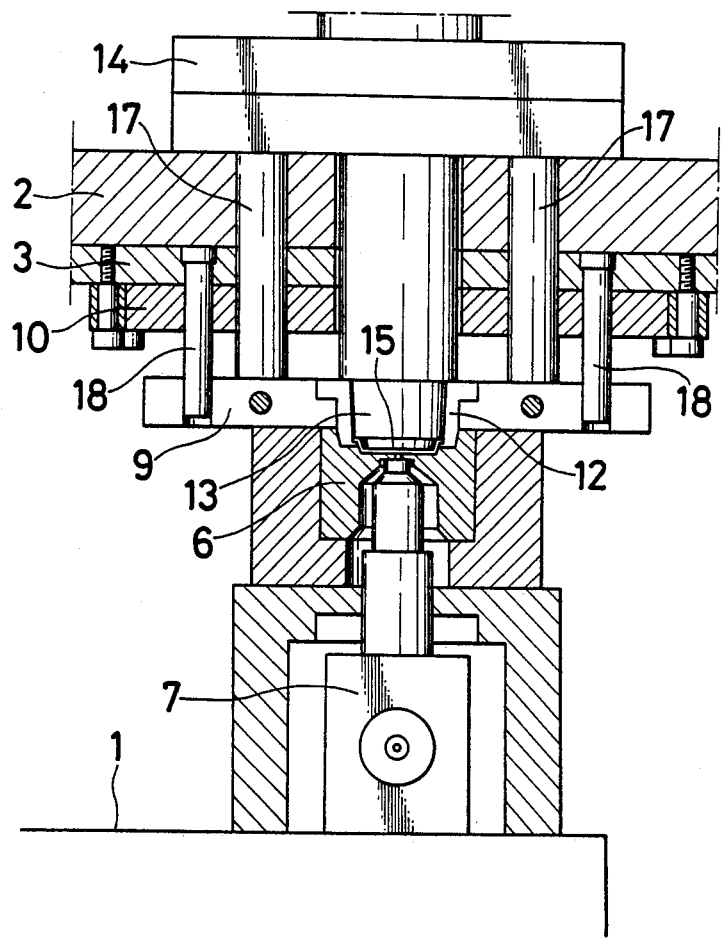
FIG. 3 is a longitudinal sectional view during the injection molding.

In the drawings, reference numeral 1 designates a machine bed, and 2 denotes an upper base plate provided above the machine bed, and a transfer plate 3 is rotatably mounted on the underside of the upper base plate.

While the overall construction of the molding machine is omitted in the drawings, the upper base plate is secured to a plurality of supports in the periphery of the machine bed, and the transfer plate 3 is designed so that it is rotated and moved intermittently through a 90° angles by a rotary device provided in the center of the upper base plate 2.

Upper base plate 2 and transfer plate 3 are formed with holes 4 and 5 having a required diameter which are superposed over each other at their stop positions, and the positions of the upper base plate 2 formed with the holes constitute operating stages or stations for molding, temperature-controlling, orientation and blow molding and releasing of a preform, and respective apparatuses are arranged at those stations.

FIG. 1 is a longitudinal sectional view showing a mold device for molding a preform, in which a cavity mold 6 for molding an outer surface of a bottom of a preform is secured together with a runner mold 7 to the machine bed 1. The required number of vertical shafts 8 are projected vertically from a member 10 in a paired relation with the holes 5 spaced apart on the lower surface of the transfer plate 3, and the vertically movable mold place plates 9 extend through the vertical shafts 8, 8, respectively.

A spring member 11 is provided between the mold place plate 9 and a flange 8a at the lower end of the vertical shaft, the mold place plate 9 being always biased toward the transfer plate by the pressure of the spring.

A lip mold 12 serving as a retaining mold for forming an outer peripheral portion of an opening of a preform is mounted on the mold place plate 9 and set to a position where the lip mold is closed with respect to the cavity mold 6 directly below the hole 5. While not shown in the drawing, the lip mold 12 comprises a split mold, which is opened and closed laterally together with the mold place plate 9.

A core mold 13 for molding an inner surface of a preform is connected to a member 14 at the forward end of a piston of a clamping cylinder (not shown) provided at the upper part of the support of the upper base plate 2. The forward end surface of the core mold 13 constitutes a mold surface 15 for forming a cavity together with the cavity mold 6 and lip mold 12, and a shoulder 16 is formed in the upper periphery of the mold surface 15 so that the shoulder may contact with the upper surface of the lip mold 12.

Mounted on both sides of the core mold of the member 14 are pressing shafts 17 which extend through holes formed on both sides of the holes 4 and 5 and come into contact with the mold place plate 9. Reference numeral 18 designates a guide pin.

In the above-described construction, where the transfer plate 3 stops and the holes 4 and 5 are superposed over each other, when the core mold 13 together with the member 14 is moved in a mold-closing direction by the clamping cylinder, the core mold 13 reaches the lip mold 12 from the holes 4 and 5. The mold surface 15 at the forward end thereof occupies a position within the lip mold 12, and the shoulder 16 comes into contact with the upper surface of the lip mold 12. At that time, the pressing shaft 17, which has moved down along with the core mold 13, comes into contact with the mold place plate 9 to downwardly move the lip mold 12 together with the core mold 13 to the cavity mold 6 through the mold place plate 9.

Thereby, the cavity mold 6, the lip mold 12 and the core mold 13 are closed to form a cavity for a flat preform.

After the molds have been closed, a clamping force is applied, and molten resin is poured into the cavity from the injection apparatus 19 always in nozzle-contact with the gate of the hot runner mold 7 to mold a flat preform 20. Thereafter, when the core mold 13 is moved upward, the lip mold 12 is also returned under the spring pressure to the lower surface of the transfer plate 3 while being in contact with the shoulder 16 at the forward end of the core mold. At that time, since the open peripheral edge of the preform 20 is held between the core mold surface 14 and the lip mold 12 surface, it is released from the cavity mold 6 and moved together with the lip mold 12 toward the transfer plate. After the mold place plate 9 has been placed in contact with the lower surface of the transfer plate, the core mold 13 is slipped out of the lip mold 12 and returned to its original position, i.e., the upper portion of the upper base plate 2. As the result, the preform 20 is left on the lip mold 12 as shown by the dash lines in FIG. 1.

Figure 4:
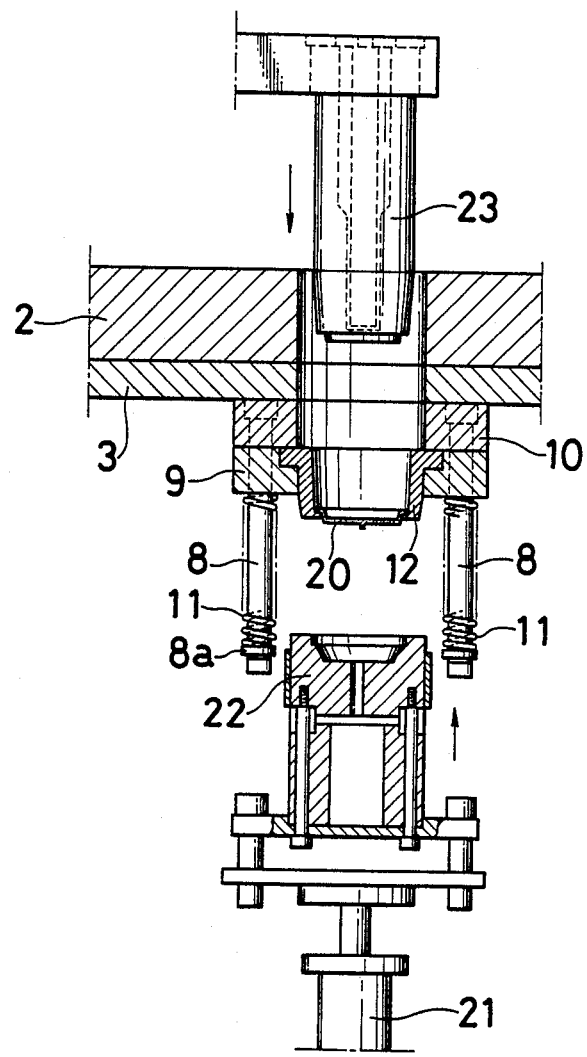
FIG. 4 is a longitudinal sectional side view of a temperature-control operating portion.

The preform 20 supported at the lip mold 12 is transferred to the subsequent operating portion through rotation of the transfer plate 3. FIG. 4 is a longitudinal sectional view of a temperature-control operating portion which includes a temperature control pot 22 connected to a cylinder device 21 provided on the machine bed 1 and disposed to move up and down. A vertically movable temperature control core 23 is disposed on the upper base plate 2, which holds the preform 20 between itself and the lip mold 12 for effecting temperature control.

The preform 20 after having been subjected to temperature control is further transferred to succeeding operating stations by rotation of transfer plate 3.

Figure 5:
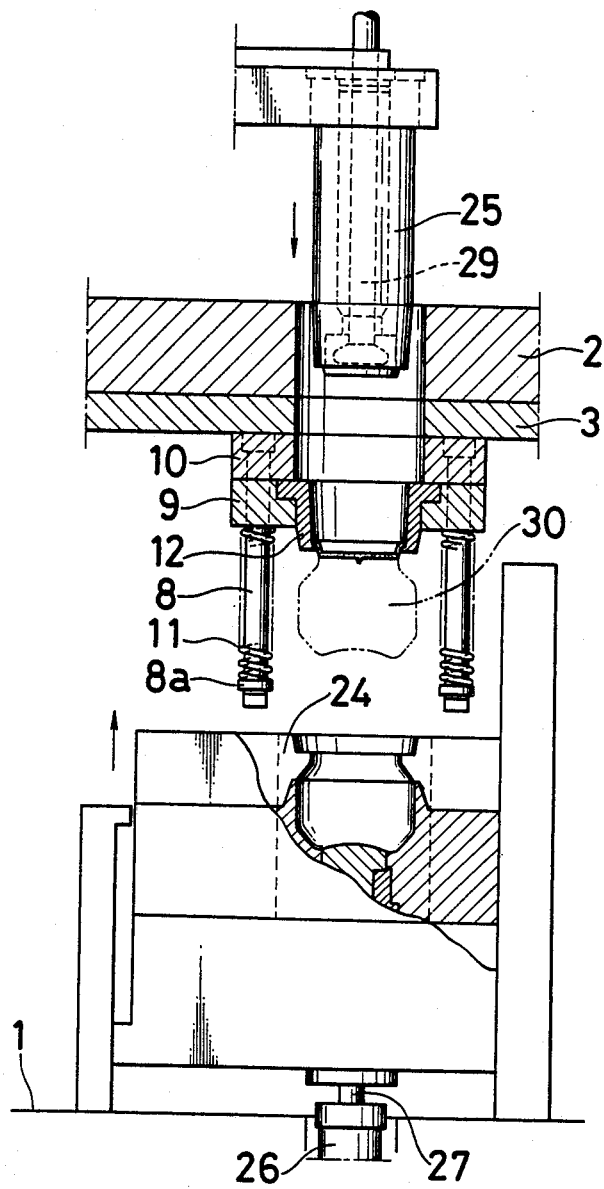
FIG. 5 is a longitudinal sectional side view of an orientation and blow operating portion.

FIG. 5 shows the orientation and blow molding operating portion in longitudinal section, which includes a blow mold 24 arranged movably up and down on the machine bed 1 and a blow core 25 provided on the upper base plate 2. Reference numeral 26 designates an elevating cylinder, and 27 designates a piston.

The blow mold 24 is opened and closed inwardly and outwardly by a cylinder device (not shown), and the blow core 25 is internally provided with an orientation rod 29, and brought into abutment with the lip mold 12 through the holes 4 and 5 to orient the preform 20 to the bottom of the mold and to expand it to the mold face of the cavity. Thus a container 30 having a predetermined shape as indicated by the dashed lines is molded.

After the mold has been opened, the mold 26 is moved down to a disengaged position from vertical shaft 8. The molded container 30 is transferred to the succeeding operating station by rotation of transfer plate 3. The lip mold 12 with the container 30 released at said operating portion is again fed to the injection molding operating portion.

Figure 6:
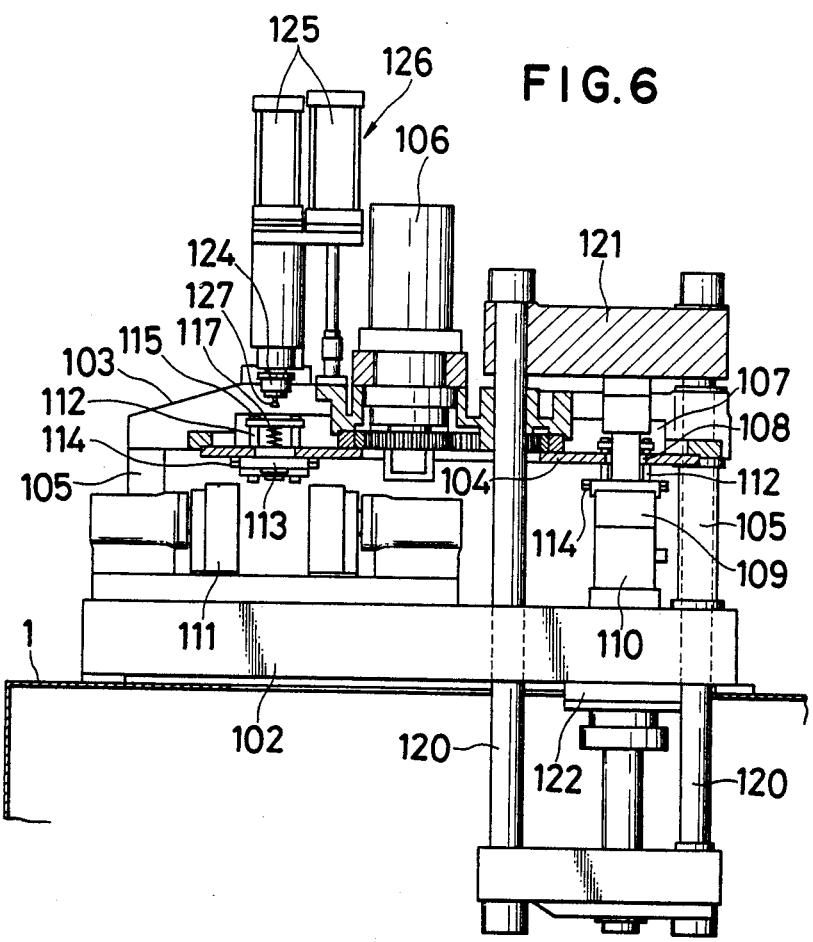
FIG. 6 is a longitudinal sectional front view showing the upper portion of a rotary type injection blow molding machine provided with a mold device for molding a preform in accordance with a further embodiment.
Figure 7:
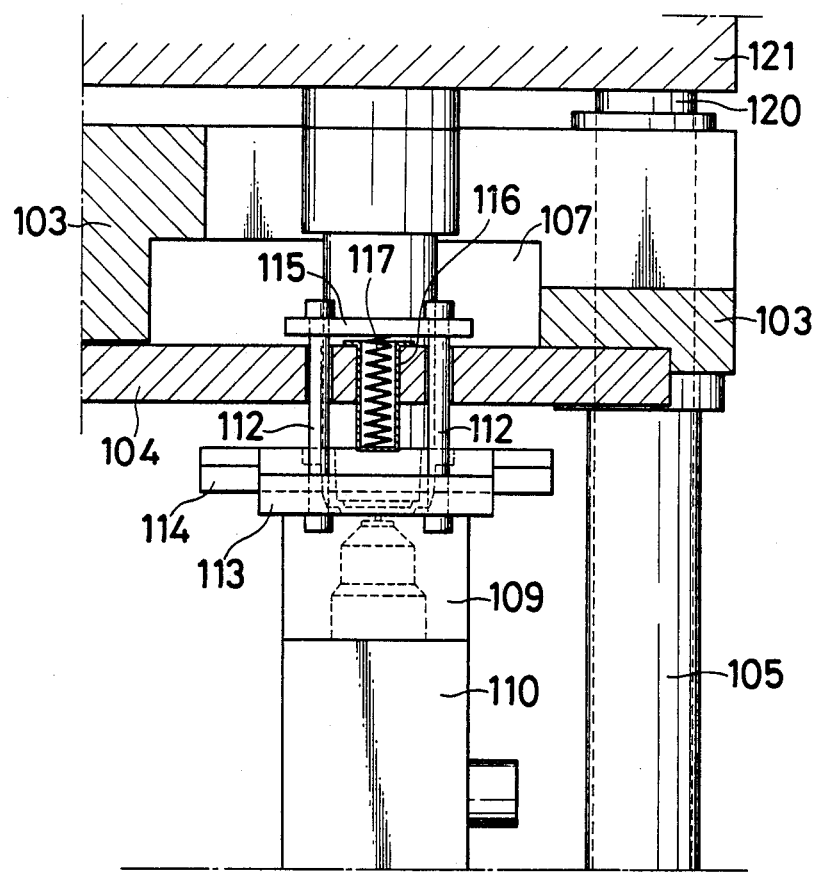
FIG. 7 is a longtitudinal sectional view of a mold device in a preform molding operating portion.
Figure 8:
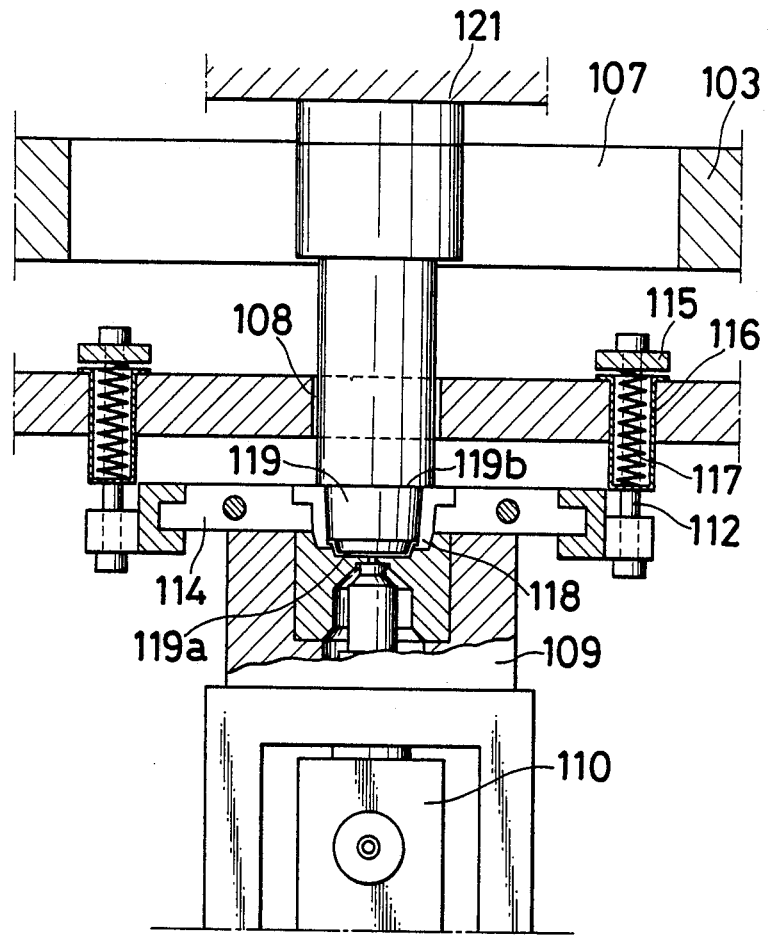
FIG. 8 is a longitudinal sectional side view thereof.

FIG. 6 and the other remaining drawings show a device according to a second embodiment which device is incorporated into a rotary type injection blow molding machine.

A lower base plate 102 is placed on and secured to a machine bed 101. An upper base plate 103 is provided above machine bed 101, and a transfer plate 104 is rotatably mounted on the underside of upper base plate 103.

The upper base plate 103 is secured to a plurality of supports 105 in the periphery of the machine bed 101. The transfer plate 114 is designed to be intermittently rotated and moved through 90° angles by a rotary device 106 provided in the center of an upper base plate 103.

Upper base plate 103 and transfer plate 104 are formed with holes 107 and 108 having a predetermined diameter superposed over each other certain stop positions. The stop positions upper base plate 103 constitute operating stations including a molding station, a temperature-controlling station, an orientation and blow molding station and a releasing of a preform, station. Appropriate apparatuses therefore are arranged at each station.

A cavity mold 109 for molding an outer surface of a bottom of a preform together with a hot runner mold 110 is secured onto the lower base plate 102 in the molding operating portion. A blow mold 111 is closeably installed in a horizontal direction on the lower base plate 102 in the orientation and blow molding portion.

Vertical shafts 112 are provided parallel to each other in a paired relation with the hole 108 spaced apart in a circumferential direction on the undersurface of the holes of transfer plate 104. A mold place plate 114, which is opened and closed inwardly and outwardly, is mounted on the lower end of the vertical shaft 112 through a guide member 113.

The vertical shaft 112 is integrally connected by connecting plates 115 provided over the upper end in a paired relation, and a spring member 117 is compressively encased in a receiving tube 116 extending through the transfer plate 104 underside of connecting plate 115. The upper end of the spring member 117 contacts connecting plate 115 to constantly and upwardly urge the pair of vertical shafts 112 through the connecting plate 115 so that the mold place plate 114 mounted on the lower end of the vertical shaft 112 is pressed against the lower surface of the transfer plate 104.

A retaining and lip mold 118 for molding an outer peripheral portion of an opening of a preform comprises a pair of split molds, each of which is mounted on the central portion of the mold place plate 114 and set to be opened and closed together with mold place plate 14 directly below hole 108 of transfer plate 104.

A core mold 119 for molding an inner surface of a preform is mounted on the lower side of a clamping member 121 over the upper ends of a plurality of vertical clamping rods 120 which extend through the transfer plate 104 and are vertically positioned, the core mold 119 being positioned upwardly of the holes 107 and 108. The forward end surface of core mold 119 fits into the lip mold 118 to constitute a mold surface 119a forming a cavity together with the cavity mold 109. A shoulder 119b is formed in the upper periphery of the mold surface 119a into contact with the upper surface of the lip mold 118.

In the above-described construction, at the location transfer plate 104 stops and holes 107 and 108 are superposed over each other, at the time when core mold 119 together with clamping mold 120 is moved in a mold-closing direction by the clamping cylinder 122 on the underside of the lower base plate 102, core mold 119 reaches lip mold 118 through holes 107 and 108. The mold surface 119a at the forward end is then fitted into lip mold 118 and the shoulder 119b comes into contact with and presses the upper surface of lip mold 118.

Thereby the mold place plate 114 is moved downwardly together with the vertical shafts 112 against the spring member 117 and comes into contact with the upper surface of the cavity mold 109. The cavity mold 109, the lip mold 118 and the core mold 119 are closed.

After the mold has been closed, a clamping force is applied, and molten resin is poured into the cavity from an injection apparatus (not shown) which is always placed to be in a nozzle-touching state with the gate of the hot runner mold 110 to mold a flat preform 123. Thereafter, when the mold is opened by the clamping cylinder 122 to move the core mold 119 upward, the mold place plate 114 together with the vertical shafts 112 is also returned under the spring pressure to the lower surface of the transfer plate 4 while lip mold 118 maintains contact with shoulder 119b of the core mold. At that time, since the open peripheral edge of the preform 123 is held between the core mold surface 119a and the mold surface of lip mold 118, the preform 123 is released from cavity mold 109 and is moved together with lip mold 118 toward the transfer plate. After the mold place plate 114 has been placed in contact with the lower surface of the transfer plate, the core mold 119 is slipped out of the lip mold 118 and returned to its original position, i.e. above the upper base plate 103. As the result, the preform 123 is left on the lip mold 118 as indicated by the dashed lines in FIG. 9.

The preform 123 together with lip mold 118 is transferred, while maintaining that state, to the orientation and blow molding operating station via the temperature control operating station by rotation of transfer plate 103.

In the orientation and blow molding operating portion, a blow core 124 having an end shape similar to the core mold 119 is provided above the upper base plate 103. Blow core 124 is connected to an elevating device 126 in the form of an air cyliner 125, and urges the lip mold 118 together with the mold place plate 114 against the spring member 117 upon the upper surface of an closed blow mold 111, by the operation similar to the core mold 119. The preform 123 is axially oriented by means of an orientation rod 127 in the center of the blow core 124 and is radially expanded by air blow from the periphery of the orientation rod to mold a biaxially oriented container (not shown).

The return of the lip mold 118 to lower surface of the transfer plate after being molded is automatically effected under the spring pressure of the spring member 117 caused by the return of the opened blow core 124, and with this return, the container is also transferred toward the transfer plate in a state where the opening thereof is held by the lip mold 118. Then, the container is transferred to a succeeding release operating station while being held by the lip mold 118 by rotation of transfer plate 104.

While the illustrated preform is flat, it is noted that other shapes may be employed for the preform. Moreover, the moving dimension of the lip mold can be the range of securing a space capable of transferring the preform together with the lip mold when the respective operating portions are opened. While in the above-described embodiment, a description has been made of molding a single preform, it is to be noted that a plurality of preforms may be simultaneously molded. This invention is not limited to the illustrated embodiments but only to the appended claims.

What is claimed is:

1. An injection molding machine, comprising:
   a machine bed and a bed plate vertically spaced from and extending generally horizontally above the machine bed;
   a plurality of horizontally spaced injection stages including a preform molding stage for molding a preform of an article and an orientation and blow molding stage for blow molding the preform into an article;

a rotatable transfer plate disposed below the bed plate and effective for transferring an article being molded from stage to stage;

a cavity mold, stationarily supported on the machine bed at the preform molding stage, for molding the preform;

an opening in the transfer plate and another opening in the bed plate projecting above the cavity mold, the respective openings in the bed plate and in the transfer plate being alignable with one another;

a mold supporting plate disposed below the transfer plate and projecting above the preform molding stage, the mold supporting plate having a molding opening therethrough;

a retaining and lip mold supported in the molding opening in the mold supporting plate and movable with the mold supporting plate;

means for vertically moving the mold supporting plate toward and away from the cavity mold, the means for moving the mold supporting plate including spring members for biasing the mold supporting plate and the retaining and lip mold toward the transfer plate and including vertically disposed shafts projecting from a lower surface of the transfer plate for guiding the mold supporting plate thereon, the spring members being mounted on the vertically disposed shafts;

the vertical shafts having upper connecting plates which are integrated into and supported on the transfer plate, a flange disposed on opposed ends of the vertical shafts and the spring members being disposed between the flanges and the mold supporting plate;

a vertically movable core mold movable vertically along the openings in the bed plate and in the transfer plate and into the retaining and lip mold, the injection molding machine being so structured that the retaining and lip mold is movable to abut the cavity mold and the core mold is movable into the retaining and lip mold to define the preform; and means for injecting resin into the cavity mold to mold a preform of an article.

2. An injection molding machine, comprising:

a machine bed and a bed plate vertically spaced from and extending generally horizontally above the machine bed;

a plurality of horizontally spaced injection stages including a preform molding stage for molding a preform of an article and an orientation and blow molding stage for blow molding the preform into an article;

a rotatable transfer plate disposed below the bed plate and effective for transferring an article being molded from stage to stage;

a cavity mold, stationarily supported on the machine bed at the preform molding stage, for molding the preform;

an opening in the transfer plate and another opening in the bed plate projecting above the cavity mold, the respective openings in the bed plate and in the transfer plate being alignable with one another;

a mold supporting plate disposed below the transfer plate and projecting above the preform molding stage, the mold supporting plate having a molding opening therethrough;

a retaining and lip mold supported in the molding opening in the mold supporting plate and movable with the mold supporting plate;

means for vertically moving the mold supporting plate toward and away from the cavity mold, the means for moving the mold supporting plate including spring members for biasing the mold supporting plate and the retaining and lip mold toward the transfer plate, each of the spring members being comprised of a coil spring and being encased in a tube which extends through the transfer plate;

a vertically movable core mold movable vertically along the openings in the bed plate and in the transfer plate and into the retaining and lip mold, the injection molding machine being so structured that the retaining and lip mold is movable to abut the cavity mold and the core mold is movable into the retaining and lip mold to define the preform; and means for injecting resin into the cavity mold to mold a preform of an article.

3. The injection molding machine as in claim 2, further comprising guide pins passing through the transfer plate and the mold supporting plate.

4. The injection molding machine as in claim 2, in which the core mold comprises a forward end surface which fits into the retaining and lip mold to define a cavity in which the preform is molded and further includes a shoulder-shaped upper peripheral portion which is disposed to contact the retaining and lip mold.

5. The injection molding machine as in claim 2, further including means for forcefully moving the core mold toward the cavity mold and means, associated with the core mold, for engaging and conveying the retaining and lip mold against the force of the spring members into abutment with the cavity mold.

6. An injection molding machine as in claim 2, in which the cavity mold is secured to the machine bed and in which the means for injecting resin comprises a hot runner coupled to the cavity mold.

7. An injection molding machine as in claim 2, in which the retaining and lip mold is effective for supportively retaining the preform in a manner which enables the preform to be transferred from the preform molding stage in the injection molding machine to another stage in the machine.

8. An injection molding machine as in claim 2, which further includes a blow mold, a blow core, and an orientation rod disposed at the orientation and blow molding stage in the injection molding machine and effective for blow molding the preform into a finished article.

9. The injection molding machine as in claim 8, in which the blow mold is supported on the machine bed and is vertically movable toward the transfer plate.

10. The injection molding machine as in claim 8, further including a lower bed plate disposed on the machine bed and wherein the blow mold is disposed on the lower bed plate and is comprised of first and second halves which are movable toward one another to define an integrated blow mold.

11. An injection molding machine as in claim 2, including vertically disposed shafts for guiding the mold supporting plate thereon.

12. An injection molding machine as in claim 11, in which the spring members are mounted on the vertically disposed shafts.

13. An injection molding device according to claim 12, in which the vertical shafts project from a lower surface of the transfer plate.

14. An injection molding machine as in claim 13, in which the means for moving the mold supporting plate are partially comprised of the core mold which is movable to engage the retaining and lip mold and to push same into abutment with the cavity mold.

* * * * *